United States Patent
Song et al.

(10) Patent No.: US 8,854,431 B2
(45) Date of Patent: Oct. 7, 2014

(54) OPTICAL SELF-DIAGNOSIS OF A STEREOSCOPIC CAMERA SYSTEM

(71) Applicants: Miao Song, Berlin (DE); Bjorn Lojewski, Berlin (DE)

(72) Inventors: Miao Song, Berlin (DE); Bjorn Lojewski, Berlin (DE)

(73) Assignee: Hella KGaA Hueck & Co. (DE)

( * ) Notice: Subject to any disclaimer, the term of this patent is extended or adjusted under 35 U.S.C. 154(b) by 0 days.

(21) Appl. No.: 13/716,430

(22) Filed: Dec. 17, 2012

(65) Prior Publication Data

US 2013/0120536 A1    May 16, 2013

Related U.S. Application Data

(63) Continuation of application No. PCT/EP2011/003053, filed on Jun. 17, 2011.

(30) Foreign Application Priority Data

Jun. 18, 2010  (DE) .......................... 10 2010 024 666

(51) Int. Cl.
- *H04N 13/02*  (2006.01)
- *G06T 7/00*  (2006.01)
- *H04N 17/00*  (2006.01)
- *H04N 13/00*  (2006.01)

(52) U.S. Cl.
CPC ........ *H04N 13/0246* (2013.01); *H04N 13/0055* (2013.01); *G06T 7/0002* (2013.01); *G06T 2207/10012* (2013.01); *H04N 13/0296* (2013.01); *H04N 13/00* (2013.01); *H04N 17/002* (2013.01); *G06T 2207/30168* (2013.01)
USPC .................... 348/46; 348/47; 348/48

(58) Field of Classification Search
None
See application file for complete search history.

(56) References Cited

U.S. PATENT DOCUMENTS

| 5,835,613 A | 11/1998 | Breed et al. |
| 6,865,289 B1 * | 3/2005 | Berestov ................. 382/154 |

(Continued)

FOREIGN PATENT DOCUMENTS

| DE | 2004028090 A1 | 6/2004 |
| DE | 102007025373 B3 | 7/2008 |

(Continued)

OTHER PUBLICATIONS

Hirschmuller H Ed—Gang Pan et al., "Accurate and Efficient Stereo Processing by Semi-Global Matching and Mutual Information", Computer Vision and Pattern Recognition, 2005 IEEE Computer Society Conference on IEEE, Piscataway NJ, Jun. 2005, pp. 807-814.
European Patent Office, "Written Opinion of the International Searching Authority", May 9, 2011, 3 pages.

*Primary Examiner* — Joseph Ustaris
*Assistant Examiner* — Frederick Bailey
(74) *Attorney, Agent, or Firm* — Yakov Sidorin; Quarles & Brady LLP

(57) ABSTRACT

The present invention relates to a method for the optical self-diagnosis of a camera system and to a camera system for carrying out the method. The method comprises recording stereo images obtained from in each case at least two partial images (2, 3) creating a depth image, that is to say a disparity map (5) given by calculated disparity values, determining a number of valid disparity values (6) of the disparity map (5), and outputting a warning signal depending on the number of valid disparity values determined. A device for carrying out such a method comprises a stereo camera (1) having at least two lenses (7,8) and image sensors, an evaluation unit and a display unit.

9 Claims, 2 Drawing Sheets

(56) References Cited

U.S. PATENT DOCUMENTS

| | | |
|---|---|---|
| 2002/0122117 A1* | 9/2002 | Nakagawa et al. ............ 348/218 |
| 2004/0183900 A1 | 9/2004 | Karpen et al. |
| 2004/0228508 A1* | 11/2004 | Shigeta ........................ 382/124 |
| 2007/0075997 A1* | 4/2007 | Rohaly et al. ................. 345/419 |
| 2010/0085447 A1* | 4/2010 | Kanemitsu et al. ........... 348/241 |
| 2011/0044502 A1* | 2/2011 | Liu et al. ....................... 382/103 |
| 2012/0095458 A1* | 4/2012 | Cybulski et al. ............... 606/41 |
| 2012/0249750 A1* | 10/2012 | Izzat et al. ..................... 348/47 |

FOREIGN PATENT DOCUMENTS

| | | |
|---|---|---|
| DE | 102008046505 A1 | 3/2010 |
| EP | 1759933 A2 | 3/2007 |
| FR | 2918744 A1 | 1/2009 |
| JP | 2001-211466 * | 8/2001 |
| WO | 0111894 | 2/2001 |
| WO | 2004045912 A1 | 6/2004 |

* cited by examiner

OPTICAL SELF-DIAGNOSIS OF A STEREOSCOPIC CAMERA SYSTEM

CROSS-REFERENCE TO RELATED APPLICATIONS

This application is a continuation of pending International Application No. PCT/EP2011/003053 filed on Jun. 17, 2011, which designates the United States and claims priority of the pending German Application No. 10 2010 024 666.2 filed on Jun. 18, 2010. Each of the abovementioned patent application is incorporated by reference herein in its entirety.

TECHNICAL FIELD

The present invention relates to a method for optical self-diagnosis of a camera system, and to a camera system for carrying out such a method.

BACKGROUND

Camera systems—and stereo camera systems in particular—react sensitively to dirt accumulation of any kind. When the camera system is a component of a monitoring system which automatically evaluates recorded images (e.g. a person counting system), there is a likelihood that detection errors consequently occur and remain unnoticed. In order to prevent impairments in the image quality and detection errors caused thereby, such camera systems can contain self-checking systems, which check whether there is any dirt accumulation or masking of the optical systems and therefore output respective warning signals. Most methods for optical self-diagnosis of a camera system which were developed up until now are based on gray-scale pictures supplied directly by the camera and require high computing power for evaluation and an enormous amount of memory.

Methods for the optical self-diagnosis of camera systems are already known from the state of the art. A rain sensor is described for example in the specification DE 10 2006 016 774 A1, in which rain is measured as a covering of the camera image on the basis of scattering of the pixel intensity.

As has already been mentioned above, such a solution comes with the disadvantage that high computing power and high memory capacity needs to be provided in order to evaluate the images.

SUMMARY OF THE INVENTION

The present invention is based on the object of developing a method for optical self-diagnosis of a camera system which avoids the mentioned disadvantages, with which therefore reliable self-diagnosis is enabled by a simple algorithm.

This object is achieved in accordance with the invention by a method for optical self-diagnosis of a camera system as explained below in detail and by a camera system for carrying out this method.

Such a method for optical self-diagnosis of a camera system for recording stereo images respectively obtained from at least two partial images may comprise at least the following steps: At first, at least one first partial image and one second partial image of an object space which is complementary to the first partial image may be recorded with the camera system from different perspectives. Complementary shall mean in this case that although both images show the same object, said object is shown from different perspectives. A stereo image can be produced from said two partial images, with an image with depth information contained in the image being understood under the term "stereo image". A depth image (e.g. a disparity map) may be produced in a subsequent, e.g. in the next step of the method. The production of the depth image occurs from the first and the second partial images on the basis of parallax(es) between mutually corresponding pixels from the partial images. Disparity values may be determined as the measure for the parallax.

Subsequently, a number of valid disparity values may be determined. A valid disparity value may be defined in this case as a disparity value which is determined for two mutually associated pixels of the partial images which may be identified unequivocally or at least with a defined probability as being mutually corresponding. In order to determine whether two pixels correspond in this sense with one another at least with a defined probability, a random reliability measure can be used in this case. A warning signal can finally be output depending on the number of the determined disparity values.

Such a method offers an advantage that the data quantity to be processed is reduced substantially by calculating the depth image and therefore quicker processing of the data can occur. It is especially advantageous that when using a disparity map as a depth image, such a map is usually already automatically calculated by stereo cameras. Conclusions can reliably be drawn from the depth image concerning soiling, dirt accumulation, adverse light conditions and masking of the camera lens system which impair the image quality. Complex evaluation of image contents of the individual partial images can therefore be avoided.

As has already been mentioned above, the depth image can be a disparity map which may be produced by a so-called "matching method", in which disparity values are determined as a measure for a parallax between corresponding pixels of both partial images by allocation of pixels of the first partial image to corresponding pixels of the second partial image. Such matching methods are known from the state of the art and are described for example in DE 10 2008 046 505 A1 as if fully disclosed herein. The disparity values obtained by the matching method can finally be displayed in a disparity map. When performing a matching method, a valid disparity value may be defined by the method as unequivocal or at least with a defined probability of mutually corresponding pixels.

The output of the warning signal caused by a comparison of the number of valid disparity values with a predetermined threshold value occurs advantageously, with the warning signal being output when the value drops beneath the predetermined threshold value.

An embodiment may further include an installation phase, in which a calibration of parameters used for self-diagnosis of the camera system may occur. The calibration can be performed in such a way that an average number of valid disparity values are determined on the basis of a test object, with the threshold value being calculated by means of the number of valid disparity values determined in this manner. Since such camera systems are frequently used in different ambient environments, a fixed threshold value cannot always be adjusted to the ambient environment. That is why the provision of an installation phase offers the advantage that the method can be adjusted to different ambient environments and consequently the camera system can be used reliably in different ambient environments.

The threshold value can be calculated in an especially advantageous manner by multiplying the average number of valid disparity values determined in the installation phase with a factor which is larger than 0. This allows the adjustment to different environmental conditions such as different light conditions with very little effort.

The recording of at least two partial images of the object space from different perspectives can advantageously occur simultaneously. As a result, the temporal changes of the object space falsifying the recording are excluded.

Related embodiments may further provide that the matching method comprises a Fourier transformation. As a result of such a Fourier transformation, which is preferably performed two-dimensionally, and the evaluation of the spatial frequency, disturbing local changes in sharpness and contrast can be taken into consideration in the evaluation.

An especially advantageous embodiment may further provide that several disparity maps are calculated and compared with one another over a specific period of time, with a warning signal only being output when the predetermined threshold value of valid disparity values is not reached in a predetermined number of calculated disparity maps. As a result, a temporal development of the object space can therefore be traced, whereas transient disturbances such as an only briefly effective obscuration of lens may not be considered.

A camera system which is suitable for carrying out such a method may comprise at least a stereo camera with at least two lenses and image sensors for recording at least two partial images, an evaluation unit for carrying out the matching method and calculating the disparity values, and an output unit for outputting the warning signal. The evaluation unit can be a circuit which is integrated in the stereo camera for example. The output unit can be provided for example by a display or any other display unit, like a LCD or TFT display or any other human machine interface (hmi) permitting to provide information to a user, e.g. a loudspeaker and/or signal lamps may be used in the case of a warning signal that shall be output acoustically or as lighting, respectively. The evaluation and output unit can also be realized by a computer.

The advantages of the invention will be provided especially well when the camera system concerns a monitoring system with automatic image evaluation, e.g. a people counting system.

BRIEF DESCRIPTION OF THE DRAWINGS

In the following, the invention will be described by way of example, without limitation of the general inventive concept, on examples of embodiment and with reference to the drawings.

Figure 1:
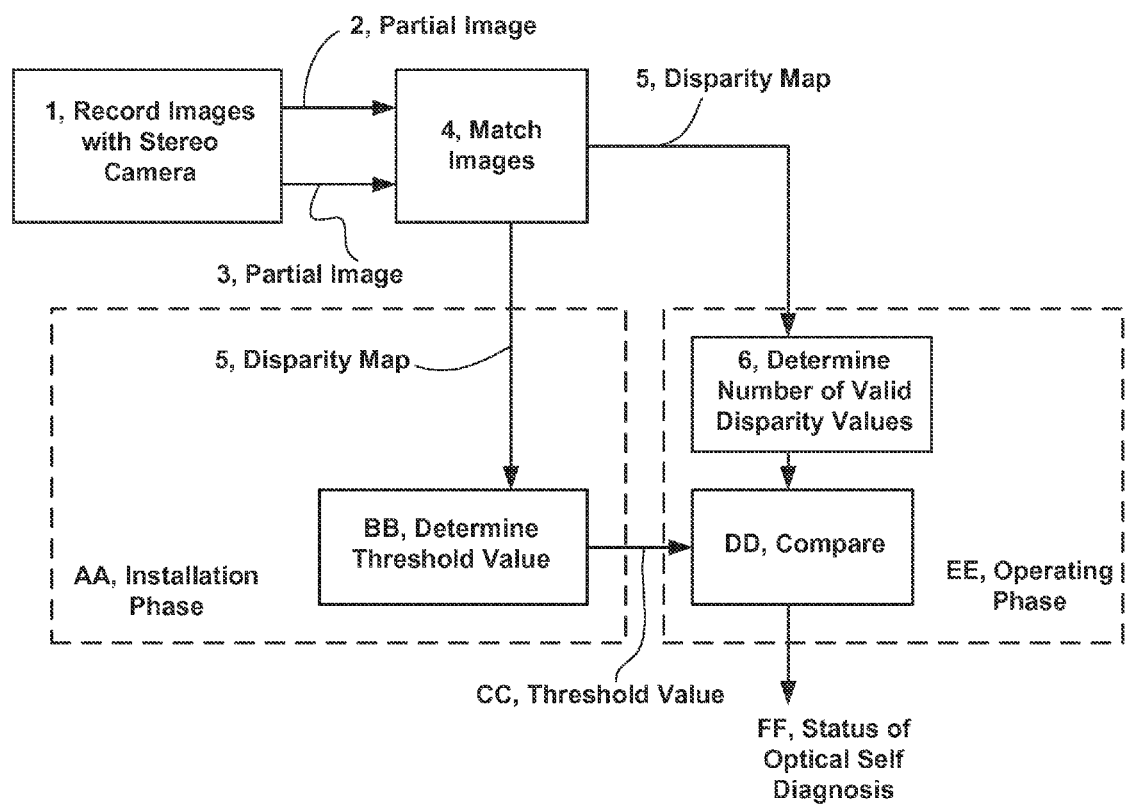
FIG. 1 shows a schematic flowchart of a method for self-diagnosis of a camera system with a stereo camera.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 shows a schematic functional sequence of a method with which a camera system can be tested automatically for functionality. This camera system concerns a numbering system. At the first step, a stereo camera 1 of the camera system simultaneously records a right partial image 2 and a left partial image 3 of an object from different perspectives. The two partial images 2, 3 are rectified at first by an algorithm, i.e. they are rectified and transformed in such a way as if they had been recorded by an ideal stereo camera system aligned in parallel. The right partial image 2 and the left partial image 3 are compared to each other line by line in a matching method 4, and mutually corresponding pixels in the two partial images 2 and 3 may be determined. A disparity value is assigned to each of these pixels, which disparity value is defined as a horizontal parallax between the position of the mutually corresponding pixels in the two partial images 2 and 3. A depth image, which in this case is therefore a disparity map 5, is determined from the disparity values.

A number of valid disparity values may be determined from said disparity map 5 in a further data-processing step 6. Valid disparity values are all disparity values which are determined for two pixels from the two partial images 2 and 3 which are assigned to each other as being corresponding with a sufficiently high level of probability. If therefore a lens of the serial camera 1 is masked or soiled, no valid disparity values can be determined in at least one area of said partial image because for pixels in this area it is not possible to find the respective pixel in the other partial image. As a result, there will be a low number of invalid disparity values. It can be provided that the disparity value of "0" is assigned to pixels to which this applies, so that the valid disparity values are all disparity values from the disparity map 5 which differ from "0". In order to take into account locally limited, disturbing changes in the sharpness and contrast of a partial image, a Fourier transformation can be performed during the matching method 4 and the matching method 4 can be continued with the data obtained therefrom.

The number of valid disparity values may be compared with the threshold value and it is decided whether there is a sufficient number of valid disparity values, which allows drawing the conclusion whether the current image information is still satisfactory.

The threshold value may be determined in an installation phase of a calibration of the camera system from the disparity map 5 obtained in the same manner, in that the average number of valid disparity values from a first recording is applied with a factor of 0.4 for example. After the comparison of the determined valid disparity values with the threshold value, a status of the optical self-diagnosis (OSD status) may be output, either a message that there is no impairment or an error message. The error message can be output either optically and/or acoustically, e.g. as a text message on a display or a warning sound.

In order to ensure that singular disturbances that are only active over a short period of time does not trigger the warning signal, the warning signal is preferably only output when a specific number of calculated disparity maps fall beneath the predetermined threshold value of valid disparity values. For this purpose, disparity maps calculated at different points in time may be compared with each other. If masking and therefore an insufficient number of valid disparity values can be proven in only one single disparity map 5, whereas in all other evaluated data the number of valid disparity values is sufficient, the warning signal may not be output.

Figure 2:
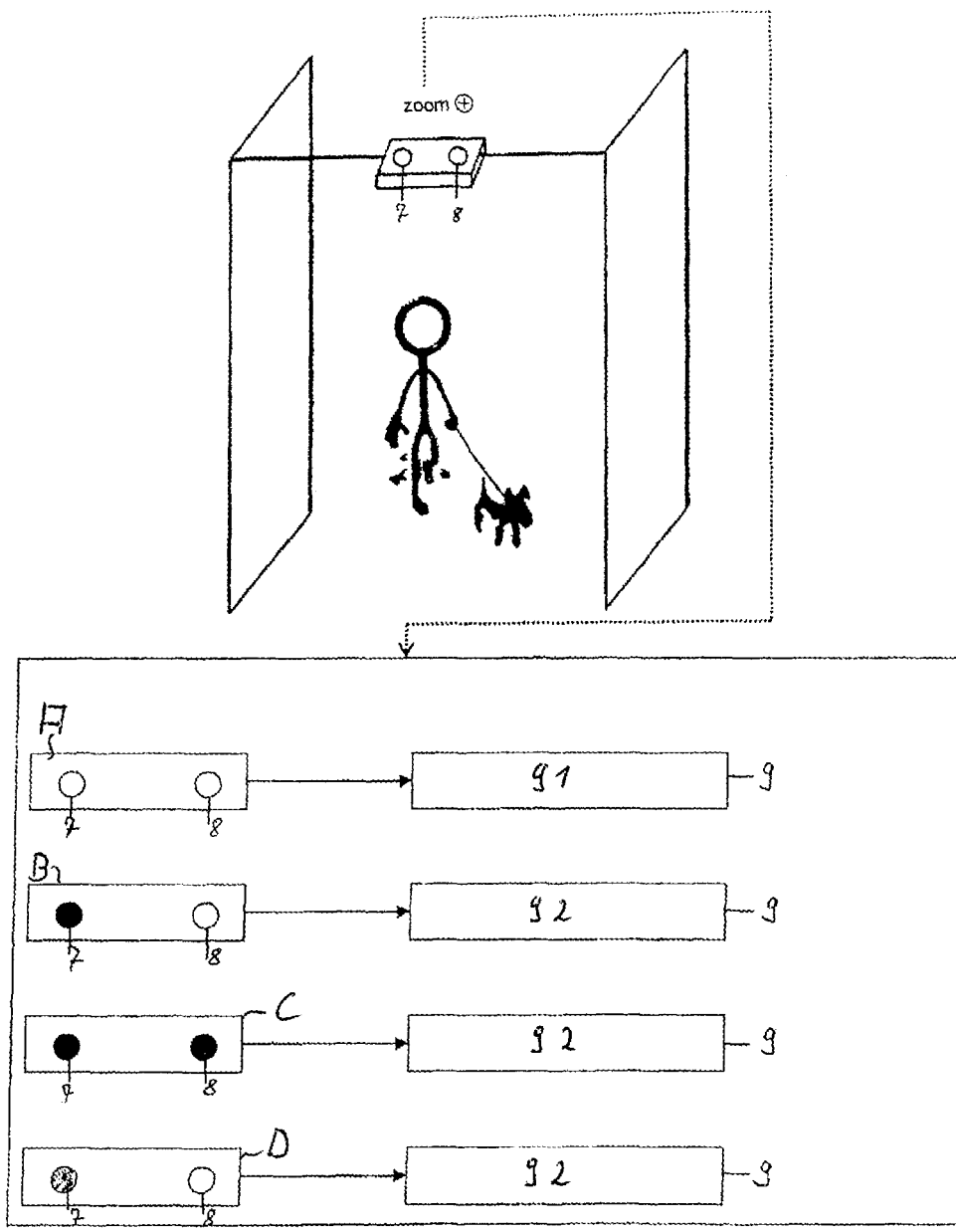
FIG. 2 shows a schematic illustration of the used stereo camera and an output diagram of the camera system.

FIG. 2 schematically shows the used stereo camera 1 with a right lens 7 and a left lens 8, and an output diagram of the status message of the optical self-diagnosis. The stereo camera 1 takes two partial images 2 and 3 of the object space to be observed with the lenses 7 and 8 and the image sensors, which partial images shall be joined into a stereo image. The production of the stereo image occurs by an evaluation unit contained in the stereo camera 1 for performing the matching method and for calculating the disparity values. Warning signals are output by a display unit 9 which is also included in the stereo camera system.

Possible errors in the recording are shown in the bottom part of FIG. 2. In the first case (A), the two lenses (i.e. the right lens 7 and the left lens 8) are clean, not masked, and the illumination is sufficient. No error message is output in this case as a status of the optical self-diagnosis. In a second case (B), one of the lenses 7 or 8 is masked. In this case, the method which has already been described above does not determine the necessary number of valid disparity values, so that the optical self-diagnosis outputs an error message as a status display. In a third illustrated case (C), the two lenses 7 and 8 are masked, so that in this case an error message is also output. In the fourth illustrated case (D), the lens 8 is soiled. Consequently, an error message is also output in this case because the matching method 4 is unable to identify a sufficient number of pixels as being mutually corresponding due to soiling. The same applies in the case which is not illustrated here in which both lenses 7 and 8 are soiled.

The disparity maps 5 allow distinguishing between global errors (e.g. full masking and image errors occurring as a result of adverse light conditions) and local errors (e.g. partial masking). These errors can also be identified with respect to their characteristics, i.e. whether there are brightness errors or sensor errors by masking.

The distribution and the frequency of invalid disparity values can be used as a measure for the occurrence of global and local errors. If a large number of invalid disparity values are concentrated in a spatial region, there is most probably a local error as a result of partial masking of a lens for example. If the number of invalid disparity values is high but distributed evenly in the image, this indicates a global error such as full masking for example.

If the functionality of the stereo camera 1 is impaired in the manner explained above, it can be deactivated and the released computing power can be used for diagnosis. In such diagnosis it is possible to provide a localization of the partial masking, e.g. a soiled lens, on the basis of the individual partial images 2, 3 and/or the stereo image.

In addition to the calculated disparity values it is also possible to store the probabilities with which the pixels can be assigned to each other. Conclusions can be drawn on global or local errors on the basis of these probabilities, which errors render the assignment of the pixels more problematic, e.g. insufficient illumination or insufficient contrast in the case of a large number of low probabilities of correspondence.

The camera system can subsequently be set up on the basis of the information obtained during self-diagnosis in such a way that a change in the settings can be made in order to eliminate any determined errors. These changes can comprise automatic brightness control, new calibration, activation of an automatic cleaning system, or also deactivation of the stereo image function and recording of mono images. As an alternative to changing the settings, the presence of an error determined by the aforementioned self-diagnosis method can be used as a necessary criterion for initiating further testing processes by using further information. The warning signal can also trigger a further testing process. These further testing processes can comprise conventional self-diagnosis methods on the basis of mono images.

It will be appreciated to those skilled in the art having the benefit of this disclosure that this invention is believed to provide an optical self diagnosis of a stereoscopic camera system. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

1 stereo camera
2 right image
3 left image
4 matching/matching unit
5 disparity map
6 Determining the number of valid disparity values
9 OS state
91 ok
92 error
A two clean lens systems, no masking, sufficient illumination
B one lens masked
C two lenses are masked
D one lens is soiled
AA installation phase
BB determining a threshold value
CC threshold value
DD Comparing the valid disparity number determined with threshold value and deciding whether the current image information is still satisfactory
EE operating phase
FF OSD state (OK or error)

The invention claimed is:
1. A method for optical self-diagnosis of a camera system adapted to record a stereo image obtained from at least two partial images, the method comprising:
   a) recording a first partial image and a second partial image of an object space with the camera system from different perspectives;
   b) producing a depth image from said first partial image and said second partial image on the basis of parallax between mutually corresponding pixels recorded in said first and second partial images, and determining disparity values representing said parallax;
   c) determining a number of valid disparity values of the depth image, wherein a valid disparity value is defined as a disparity value which is determined for two pixels, recorded in the first and second partial images, which are identified as being mutually corresponding either unequivocally or at least with a defined probability;
   d) producing a warning signal depending on the number of said valid disparity values, wherein a comparison of the number of valid disparity values is performed with a predetermined threshold value, and the warning signal is produced when said number of disparity values falls below the predetermined threshold value, wherein several disparity maps are calculated and compared with each other over a period of time, with the warning signal being produced only when a number of valid disparity values in the calculated disparity maps falls below the predetermined threshold value of valid disparity values within said period of time.

2. A method according to claim 1, wherein said depth image includes a disparity map, which is produced by carrying out a matching method in which said disparity values are determined as a measure for the parallax between the corresponding pixels of the first and second partial images by allocating a pixel recording the first partial image to a corresponding pixel recording the second partial image.

3. A method according to claim 1, further comprising calibrating, in an installation phase, parameters used for optical self-diagnosis of the camera system.

4. A method according to claim 1, wherein said calibrating in an installation phase includes calibrating parameters in such a way that an average number of valid disparity values is determined on the basis of a test object, with a threshold value being calculated by means of the number of valid disparity values determined in this manner.

5. A method according to claim 4, wherein said threshold value is calculated by multiplying said average number of valid disparity values, determined in the installation phase, with a factor which is larger than 0.

6. A method according to claim 1, wherein said recording of the first and second partial images of the object space from different prospective is effectuated simultaneously.

7. A method according to claim 2, wherein said matching method comprises a Fourier transformation.

8. A camera system configured to perform a method according to claim 1, comprising:
a stereo camera with at least two lenses and image sensors for recording the at least two partial images,
an evaluation electronic circuit configured to produce a depth image and calculate the disparity values, and
an output display unit adapted to produce a warning signal.

9. A camera system according to claim 8, wherein said camera system includes one of a person-counting system and a monitoring system with automatic image evaluation.

\* \* \* \* \*